(12) United States Patent
Choi et al.

(10) Patent No.: US 11,078,084 B2
(45) Date of Patent: Aug. 3, 2021

(54) AEROGEL PRECURSOR AND AEROGEL PREPARED USING THE SAME

(71) Applicant: LG CHEM, LTD., Seoul (KR)

(72) Inventors: Hee Jung Choi, Daejeon (KR); Kyoung Shil Oh, Daejeon (KR); Yeong Rae Chang, Daejeon (KR); Je Kyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 134 days.

(21) Appl. No.: 15/736,725

(22) PCT Filed: Dec. 15, 2016

(86) PCT No.: PCT/KR2016/014750
§ 371 (c)(1),
(2) Date: Dec. 14, 2017

(87) PCT Pub. No.: WO2017/159968
PCT Pub. Date: Sep. 21, 2017

(65) Prior Publication Data
US 2018/0162737 A1      Jun. 14, 2018

(30) Foreign Application Priority Data
Mar. 16, 2016   (KR) .................. 10-2016-0031444

(51) Int. Cl.
| C08G 77/18 | (2006.01) |
| C01B 33/158 | (2006.01) |
| C07F 7/28 | (2006.01) |
| C09K 3/30 | (2006.01) |
| B01J 13/00 | (2006.01) |
| C07F 7/08 | (2006.01) |
| C08G 77/06 | (2006.01) |
| C08G 77/38 | (2006.01) |

(52) U.S. Cl.
CPC ....... *C01B 33/1585* (2013.01); *B01J 13/0091* (2013.01); *C01B 33/158* (2013.01); *C07F 7/08* (2013.01); *C07F 7/087* (2013.01); *C07F 7/0874* (2013.01); *C07F 7/28* (2013.01); *C08G 77/06* (2013.01); *C08G 77/18* (2013.01); *C08G 77/38* (2013.01); *C09K 3/30* (2013.01); *C01P 2006/11* (2013.01); *C01P 2006/12* (2013.01); *C01P 2006/14* (2013.01); *C01P 2006/16* (2013.01); *C01P 2006/37* (2013.01)

(58) Field of Classification Search
CPC ...... C08G 77/18; C08G 77/045; C08G 77/38; C07F 7/28; C07F 7/18
See application file for complete search history.

(56) References Cited

U.S. PATENT DOCUMENTS

| 5,789,075 A | 8/1998 | Frank et al. |
| 6,319,852 B1 | 11/2001 | Smith et al. |
| 2005/0046086 A1 | 3/2005 | Lee et al. |
| 2005/0167891 A1 | 8/2005 | Lee et al. |
| 2006/0286813 A1 | 12/2006 | Meredith et al. |
| 2007/0148435 A1 | 6/2007 | Meredith et al. |
| 2008/0093016 A1 | 4/2008 | Lee et al. |
| 2008/0292889 A1 | 11/2008 | Harvey et al. |
| 2010/0324210 A1* | 12/2010 | Hidaka ............... C09D 183/04 524/751 |
| 2011/0223329 A1 | 9/2011 | Meredith et al. |
| 2011/0240907 A1* | 10/2011 | Sharma ............... C01B 33/1585 252/62 |
| 2013/0296596 A1 | 11/2013 | Suh et al. |

FOREIGN PATENT DOCUMENTS

| CN | 102317209 | 1/2012 |
| CN | 102557577 | 7/2012 |
| JP | 2008195851 | 8/2008 |
| JP | 2011190551 | 9/2011 |
| JP | 2016017255 | 2/2016 |
| KR | 10-2011-0082379 | 7/2011 |
| KR | 10-2011-0126381 | 11/2011 |
| KR | 10-1105436 | 1/2012 |

(Continued)

OTHER PUBLICATIONS

Wu et al NPL: "Preparation and surface modification mechanism of silica aerogels via ambient pressure drying", Materials Chemistry and Physics 129 (2011) pp. 308-314.*
XP-002783075, Database WPI Week Nov. 2013, AN2012-H93967, Thomson Scientific—Summary of Application No. KR20100132493, published as KR20120070948 (2017).
Wu et al., "Preparation and surface modification mechanism of silica aerogels via ambient pressure drying," Mat. Chem. and Phys. 129:308-314 (2011).

(Continued)

*Primary Examiner* — Kuo Liang Peng
(74) *Attorney, Agent, or Firm* — Dentons US LLP

(57) ABSTRACT

The present disclosure provides an aerogel precursor including an alkoxydisiloxane-based prepolymer and having a functional group derived from a hydrophobic sol-gel forming agent of the following Chemical Formula 1 on a surface thereof, and therefore, capable of enhancing high temperature thermal stability of an aerogel providing hydrophobic pores having uniform pore size distribution when preparing an aerogel, and an aerogel prepared using the same:

[Chemical Formula 1]

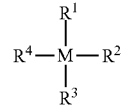

(in Chemical Formula 1, M, R, $R^1$ to $R^4$ are the same as defined in the specification.)

14 Claims, 2 Drawing Sheets

(56) References Cited

FOREIGN PATENT DOCUMENTS

| KR | 10-2012-0012836 | 2/2012 |
| KR | 10-2012-0070948 | 7/2012 |
| KR | 10-1199958 | 11/2012 |
| KR | 10-2013-0123942 | 11/2013 |
| KR | 10-2014-0146814 | 12/2014 |
| KR | 10-2015-0089319 | 8/2015 |
| KR | 10-2015-0090320 | 8/2015 |
| WO | 2010080237 | 7/2010 |

OTHER PUBLICATIONS

Venkateswara Rao et al., "Comparative studies of the physical and hydrophobic properties of TEOS based silica aerogels using different co-precursors," Science and Technology of Advanced Materials (2003) 4(6):509-515.

* cited by examiner

AEROGEL PRECURSOR AND AEROGEL PREPARED USING THE SAME

This application is a National Stage Application of International Application No. PCT/KR2016/014750 filed on Dec. 15, 2016, which claims priority to and the benefit of Korean Patent Application No. 10-2016-0031444 filed with the Korean Intellectual Property Office on Mar. 16, 2016, both of which are incorporated herein in their entirety by reference for all purposes as if fully set forth herein.

FIELD OF THE INVENTION

The present application claims priority to and the benefits of Korean Patent Application No. 10-2016-0031444 filed with the Korean Intellectual Property Office on Mar. 16, 2016, the entire contents of which are incorporated herein by reference.

The present disclosure relates to an aerogel precursor capable of enhancing high temperature thermal stability of an aerogel by forming hydrophobic pores having uniform size distribution in the aerogel preparation due to excellent hydrophobicity, and an aerogel prepared using the same.

DESCRIPTION OF THE RELATED ART

An aerogel is a material with a porous structure formed with $SiO_2$ nanostructures moderately entangled like non-woven fabric, and having air occupying 98% of the total volume. An aerogel has high porosity, nano-level micropores and a high specific surface area, and thereby exhibits ultralight, super-insulation and low dielectric properties, and applied researches as insulation materials and environmental-friendly high temperature insulation materials, extremely low dielectric thin films for high integrated devices, catalysts and catalyst carriers, electrodes for super capacitors or electrode materials for seawater desalination have been actively ongoing.

A biggest advantage of an aerogel is super-insulation exhibiting thermal conductivity of 0.300 W/mK or lower, which is lower than existing organic insulation materials such as Styrofoam. In addition, an aerogel is used as a high temperature insulation material since there is no concern over vulnerability to fire and harmful gas generation in the event of fire, which are fatal weaknesses of organic insulation materials.

However, in high temperature insulation materials, durability is an important factor together with low thermal conductivity, and for durability, thermal denaturation caused by moisture penetration needs to be prevented.

For this, surface hydrophobization capable of preventing moisture penetration is essential. As hydrophobic groups on the aerogel surface are stable without being oxidized by heat, excellent durability is obtained.

In existing aerogel syntheses, tetraethoxysilane (TEOS) or prehydrolyzed TEOS has been used as a precursor, and aerogels having hydrophobicity have been prepared by controlling a porosity of a wet gel using water, alcohol and an acid or base catalyst, and through atmospheric drying/supercritical drying after hydrophobic surface modification. However, when the wet gel surface is hydrophobic surface modified after preparing the wet gel, the phase is a bi-phase of liquid/solid, and therefore, reaction efficiency therein is low compared to in a liquid state, a single phase. Accordingly, a surface hydrophobizing agent is used in large quantities when surface hydrophobizing the wet gel, and as a result, the aerogel is readily oxidized by heat due to the remaining surface hydrophobizing agent leading to a problem of high temperature durability decrease.

PRIOR ART DOCUMENT

Patent Document (Patent Document 1) Korean Patent Application Laid-Open Publication No. 2012-0070948 (published on 2012 Jul. 2)

DISCLOSURE OF THE INVENTION

Technical Problem

The present disclosure is directed to provide an aerogel precursor capable of enhancing high temperature thermal stability of an aerogel by forming hydrophobic pores having uniform size distribution in the aerogel preparation due to excellent hydrophobicity, and a method for preparing the same.

The present disclosure is also directed to provide an aerogel prepared using the aerogel precursor, and an insulation material including the same.

Technical Solution

The present disclosure has been made in view of the above, and one embodiment of the present disclosure provides an aerogel precursor including an alkoxydisiloxane-based prepolymer, and having a functional group derived from a hydrophobic sol-gel forming agent of the following Chemical Formula 1 on a surface thereof:

[Chemical Formula 1]

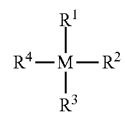

In Chemical Formula 1,

M is any one selected from the group consisting of group 4 elements and group 14 elements, $R^1$ to $R^4$ are each independently a hydrophobic functional group or a functional group reactive with the alkoxydisiloxane-based prepolymer, however, $R^1$ to $R^4$ are not a hydrophobic functional group or a functional group reactive with the alkoxydisiloxane-based prepolymer at the same time.

Another embodiment of the present disclosure provides a method for preparing the aerogel precursor including preparing an alkoxydisiloxane-based prepolymer by hydrolyzing and polycondensation reacting an alkoxysilane-based compound; and reacting the alkoxydisiloxane-based prepolymer with the hydrophobic sol-gel forming agent of Chemical Formula 1.

Still another embodiment of the present disclosure provides an aerogel prepared using the aerogel precursor.

Yet another embodiment of the present disclosure provides an insulation material including the aerogel.

Advantageous Effects

An aerogel precursor according to the present disclosure has hydrophobicity itself, and accordingly, is capable of providing hydrophobic pores having uniform size distribution in aerogel preparation, and as a result, is capable of enhancing high temperature thermal stability of the aerogel.

DESCRIPTION OF DRAWINGS

The following drawings attached to the present specification illustrate preferred embodiments of the present disclosure, and perform a role of further illuminating technological ideas of the present disclosure together with the descriptions of the disclosure provided above, and therefore, the present disclosure is not to be construed as being limited to such descriptions provided in the drawings.

MODE FOR CARRYING OUT THE INVENTION

Figure 1A:
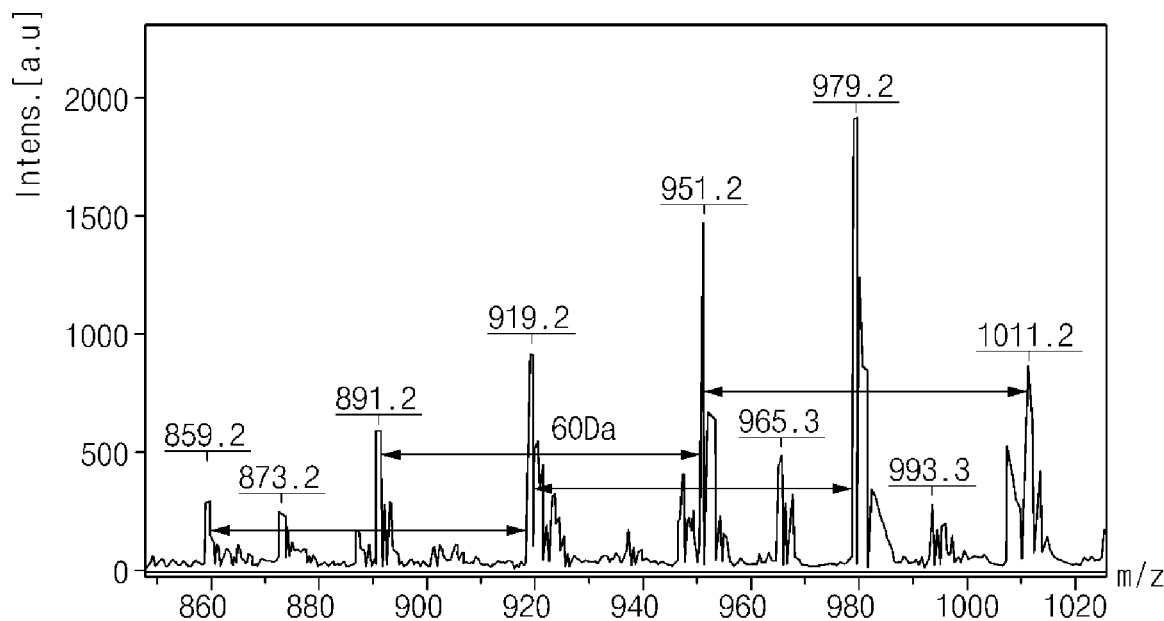
FIG. 1a and FIG. 1b are graphs showing Matrix Associated Laser Desorption Ionization-Time of Flight mass spectrometry (MALDI-TOF) analysis results for a prepolymer prepared in Synthesis Example 1.

Hereinafter, the present disclosure will be described in more detail in order to illuminate the present disclosure.

Terms or words used in the present specification and the claims are not to be interpreted limitedly to common or dictionary meanings, and shall be interpreted as meanings and concepts corresponding to technological ideas of the present disclosure based on a principle in which inventors may suitably define the concepts of terms in order to describe their own invention in the best possible way.

In the present disclosure, by hydrophobizing a surface of an alkoxydisiloxane-based prepolymer for aerogel preparation using a hydrophobic sol-gel forming agent including a functional group reactive with the alkoxydisiloxane-based prepolymer together with a hydrophobic functional group, pore sizes may be uniformly controlled while hydrophobizing the inside of the pores when preparing an aerogel, and as a result, high temperature thermal stability of the aerogel may be enhanced.

Specifically, an aerogel precursor according to one embodiment of the present disclosure includes an alkoxydisiloxane-based prepolymer, and has a functional group derived from a hydrophobic sol-gel forming agent of the following Chemical Formula 1 on a surface thereof:

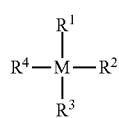

[Chemical Formula 1]

In Chemical Formula 1,

M is any one selected from the group consisting of group 4 elements and group 14 elements, $R^1$ to $R^4$ are each independently a hydrophobic functional group or a functional group reactive with the alkoxydisiloxane-based prepolymer, however $R^1$ to $R^4$ are not a hydrophobic functional group or a functional group reactive with the alkoxydisiloxane-based prepolymer at the same time.

In the present disclosure, a prepolymer means a preliminary polymer partially polymerized by controlling a degree of hydrolysis in a polymerization or polycondensation reaction for preparing a polymer, and having a relatively low degree of polymerization. Specifically, the prepolymer in the present disclosure has an m/z of 5000 or less and more specifically an m/z of 3000 or less when analyzing the mass using Matrix Associated Laser Desorption Ionization-Time of Flight mass spectroscopy (MALDI-TOF).

More specifically, in Chemical Formula 1, M may be selected from the group consisting of Ti, Hf, Si and Zr. In addition, when $R^1$ to $R^4$ in Chemical Formula 1 are a hydrophobic functional group, $R^1$ to $R^4$ may be each independently selected from the group consisting of a hydrocarbon group having 1 to 20 carbon atoms, a (meth)acryloyl group, an alkyloyl group having 1 to 20 carbon atoms and an alkyloyloxy group having 1 to 20 carbon atoms, and more specifically, may be selected from the group consisting of a linear or branched alkyl group having 1 to 20 carbon atoms such as a methyl group, an ethyl group, a propyl group or a butyl group; an alkenyl group having 2 to 20 carbon atoms such as an ethenyl group; an alkynyl group having 2 to 20 carbon atoms such as an ethynyl group; a cycloalkyl group having 3 to 20 carbon atoms such as a cyclobutyl group or a cyclohexyl group; an aryl group having 6 to 20 carbon atoms such as a phenyl group; an arylalkyl group having 7 to 20 carbon atoms such as a benzyl group; an alkylaryl group having 7 to 20 carbon atoms such as a 4-methylphenyl group; a (meth)acryloyl group such as an acryloyl group or a methacryloyl group; an alkyloyl group having 1 to 20 carbon atoms such as an acetyl group, a propionyl group, an n-butyryl group, an iso-butyryl group or a stearoyl group; and an alkyloyloxy group having 1 to 20 carbon atoms such as a propionyloxy group, an n-butyryloxy group or a stearoyloxy group, and even more specifically, may be selected from the group consisting of an alkyl group having 1 to 10 carbon atoms, a cycloalkyl group having 3 to 12 carbon atoms; an aryl group having 6 to 12 carbon atoms, an arylalkyl group having 7 to 13 carbon atoms, an alkylaryl group having 7 to 13 carbon atoms, an alkyloyl group having 10 to 20 carbon atoms and an alkyloyloxy group having 10 to 20 carbon atoms.

In addition, when $R^1$ to $R^4$ is a functional group reactive with the alkoxydisiloxane-based prepolymer in Chemical Formula 1, $R^1$ to $R^4$ may be specifically selected from the group consisting of a halogen group such as a chloro group, a bromo group or an iode group; a hydroxyl group; and an alkoxy group having 1 to 20 carbon atoms such as a methoxy group, an ethoxy group and a propoxy group, and more specifically, may be a halogen group or an alkoxy group having 1 to 10 carbon atoms. Particularly, when M is Si in Chemical Formula 1, the reactive functional group may be a halogen group.

More specifically, when considering that the degree of hydrophobicity in the pores may increase when preparing an aerogel, and as a result, high temperature thermal stability of the aerogel may be further improved, the hydrophobic sol-gel forming agent of Chemical Formula 1 may be a compound of the following Chemical Formula 2 having a mono-halide reaction site:

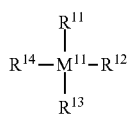

[Chemical Formula 2]

In Chemical Formula 2, $M^{11}$ is a group 14 element, and more specifically Si, $R^{11}$ is a mono-halide reaction site reacting with a silanol group in the alkoxydisiloxane-based prepolymer, and specifically, is a halogen group such as a chloro group, a bromo group or an iode group, and more specifically, is a chloro group or a bromo group, $R^{12}$ to $R^{14}$ are each independently a hydrophobic functional group, and may be a hydrocarbon group having 1 to 20 carbon atoms, and specifically, may be selected from the group consisting of an alkyl group having 1 to 20 carbon atoms, an alkenyl group having 2 to 20 carbon atoms, an alkynyl group having 2 to 20 carbon atoms, a cycloalkyl group having 3 to 20 carbon atoms, an aryl group having 6 to 20 carbon atoms, an arylalkyl group having 7 to 20 carbon atoms and an alkylaryl group having 7 to 20 carbon atoms, and more specifically, may be selected from the group consisting of an alkyl group having 1 to 12 carbon atoms, an aryl group having 6 to 12 carbon atoms, an arylalkyl group having 7 to 13 carbon atoms and an alkylaryl group having 7 to 13 carbon atoms.

Even more specifically, in Chemical Formula 2, $M^{11}$ is Si, $R^{11}$ is a chloro group or a bromo group, and $R^{12}$ to $R^{14}$ may be each independently selected from the group consisting of an alkyl group having 1 to 12 carbon atoms, an aryl group having 6 to 12 carbon atoms, an arylalkyl group having 7 to 13 carbon atoms and an alkylaryl group having 7 to 13 carbon atoms, and among these, $M^{11}$ is Si, $R^{11}$ is a chloro group or a bromo group, and $R^{12}$ to $R^{14}$ may be each independently selected from the group consisting of an aryl group having 6 to 12 carbon atoms, an arylalkyl group having 7 to 13 carbon atoms and an alkylaryl group having 7 to 13 carbon atoms.

Specific examples of the compound of Chemical Formula 2 may include chlorotrimethylsilane, chlorotriethylsilane, bromotrimethylsilane, bromotriethylsilane, chloro(methyl)diphenylsilane or the like, and compounds of any one, or two or more thereof may be used.

In addition, when considering advantages of forming uniform pores in aerogel preparation, fast surface hydrophobization due to high reactivity of the alkoxydisiloxane-based prepolymer with an alkoxy group, and excellence of heat resistance improving effects, the hydrophobic sol-gel forming agent of Chemical Formula 1 may be more specifically a compound of the following Chemical Formula 3:

[Chemical Formula 3]

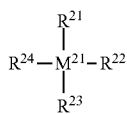

In Chemical Formula 3, $M^{21}$ is specifically a group 4 element of Ti, Zr, Hf or Rf, and more specifically Ti or Zr, $R^{21}$ to $R^{24}$ are each independently a hydrophobic functional group selected from the group consisting of a hydrocarbon group having 1 to 20 carbon atoms, an alkyloyl group having 1 to 20 carbon atoms, and an alkyloyloxy group having 1 to 20 carbon atoms; or a reactive functional group selected from the group consisting of a halogen group, a hydroxyl group, and an alkoxy group having 1 to 20 carbon atoms, however, $R^{21}$ to $R^{24}$ are not a hydrophobic functional group or a functional group reactive with the alkoxydisiloxane-based prepolymer at the same time. Specifically, $R^{21}$ to $R^{24}$ may be each independently a hydrophobic functional group selected from the group consisting of an alkyl group having 1 to 10 carbon atoms, a cycloalkyl group having 3 to 12 carbon atoms; an aryl group having 6 to 12 carbon atoms, an arylalkyl group having 7 to 13 carbon atoms, an alkylaryl group having 7 to 13 carbon atoms, an alkyloyl group having 10 to 20 carbon atoms and an alkyloyloxy group having 10 to 20 carbon atoms; or a reactive functional group that is a halogen group or an alkoxy group having 1 to 10 carbon atoms, however, $R^{21}$ to $R^{24}$ are not a hydrophobic functional group or a functional group reactive with the alkoxydisiloxane-based prepolymer at the same time.

More specifically, in the compound of Chemical Formula 3, $M^{21}$ is Ti, $R^{21}$ is an alkoxy group having 1 to 10 carbon atoms, and $R^{22}$ to $R^{23}$ are each independently an alkyloyloxy group having 10 to 20 carbon atoms.

Specific examples of the compound of Chemical Formula may include titanium triisostearoylisopropoxide, zirconium (IV) triisostearoylisopropoxide or the like, and any one or a mixture of two or more thereof may be used. More specifically, the compound of Chemical Formula 3 may be titanium triisostearoylisopropoxide.

The functional group derived from the hydrophobic sol-gel forming agent of Chemical Formula 1 may be included in 0.1 mol % to 60 mol % with respect to the total mole of the alkoxy group in the alkoxydisiloxane-based prepolymer. The content of the functional group derived from the hydrophobic sol-gel forming agent being greater than 60 mol % may cause concern such that a wet gel may not be efficiently formed when preparing an aerogel thereafter. More specifically, the content may be from 1 mol % to 40 mol %, and even more specifically from 2 mol % to 20 mol %.

In addition, the aerogel precursor according to one embodiment of the present disclosure is prepared by reacting the alkoxydisiloxane-based prepolymer prepared by hydrolyzing and polycondensation reacting an alkoxysilane-based compound with the hydrophobic sol-gel forming agent of Chemical Formula 1, and herein, thermal conductivity and structural stability may be further enhanced through controlling the silica ($SiO_2$) content in the alkoxydisiloxane-based prepolymer and the degree of hydrolysis, and the degree of polymerization or the molecular weight of the prepolymer.

Specifically, the alkoxydisiloxane-based prepolymer included in the aerogel precursor of the present disclosure may have a degree of hydrolysis of 50% to 85%. When the alkoxydisiloxane-based prepolymer has a degree of hydrolysis of less than 50%, wet gel formation may take longer, and transparency and heat resistance of an aerogel may be reduced, and the degree of hydrolysis being greater than 85% may cause concern over stability decrease in the alkoxydisiloxane-based prepolymer itself. More specifically, the degree of hydrolysis of the alkoxydisiloxane-based prepolymer may be from 60% to 80% and even more specifically from 65% to 75%.

In addition, as described above, the functional group derived from the compound of Chemical Formula 1 is present binding at the end of the alkoxydisiloxane-based prepolymer or on the surface side of the alkoxydisiloxane-based prepolymer particles since the reaction with the compound of Chemical Formula 1 occurs after preparing the alkoxydisiloxane-based prepolymer. Due to such a position of the functional group, inside the pores may exhibit hydrophobicity when preparing an aerogel.

Furthermore, the alkoxydisiloxane-based prepolymer has molecular weight distribution with an m/z (ratio of mass to charge) value of 650 to 3,000 when analyzing the mass by MALDI-TOF, and the molecular weight of the alkoxydisiloxane-derived repeating unit, a major repeating unit, may be from 60 Da to 140 Da. The alkoxydisiloxane-based prepolymer satisfying such a molecular weight condition may provide internal pores uniform for an aerogel and hydrophobized.

More specifically, the alkoxydisiloxane-based prepolymer has a degree of hydrolysis of 75% to 80%, and has an m/z value of 700 to 2,500 when analyzed by MALDI-TOF, and the molecular weight of the alkoxydisiloxane-derived repeating unit may be from 60 Da to 134 Da, and more specifically 60 Da.

The aerogel precursor having such a structure may be specifically prepared using a preparation method including preparing an alkoxydisiloxane-based prepolymer by hydrolyzing and polycondensation reacting an alkoxysilane-based compound (step 1); and reacting the alkoxydisiloxane-based prepolymer with the hydrophobic sol-gel forming agent of Chemical Formula 1 (step 2). Accordingly, another embodiment of the present disclosure provides a method for preparing the aerogel precursor.

Hereinafter, each step will be described in more detail. The first step for preparing the aerogel precursor is a step of preparing an alkoxydisiloxane-based prepolymer preparing an alkoxydisiloxane-based prepolymer by hydrolyzing and polycondensation reacting an alkoxysilane-based compound.

The alkoxysilane-based compound may specifically be a compound of the following Chemical Formula 4:

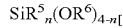   [Chemical Formula 4]

In Chemical Formula 4, $R^5$ and $R^6$ are each independently an alkyl group having 1 to 6 carbon atoms or a phenyl group, and n may be an integer of 0 to 2. In addition, when $R^5$ and $R^6$ are each two or greater, the two or more $R^5$s and the two or more $R^6$s may be the same as or different from each other.

More specifically, examples of the alkoxysilane-based compound may include difunctional alkoxysilane such as dimethyldimethoxysilane, dimethyldiethoxysilane, diphenyldiethoxysilane, diphenyldimethoxysilane, methylphenyldiethoxysilane, methylphenyldimethoxysilane, diethyldiethoxysilane or diethyldimethoxysilane; trifunctional alkoxysilane such as methyltrimethoxysilane, methyltriethoxysilane, ethyltrimethoxysilane, ethyltriethoxysilane, phenyltrimethoxysilane or phenyltriethoxysilane; tetrafunctional ethoxysilane such as tetramethoxysilane or tetraethoxysilane, or the like, and any one or a mixture of two or more thereof may be used.

Hydrolysis and condensation reaction of the alkoxysilane-based compound may be carried out by reacting the compound with water in a solvent under the presence of an acid or base catalyst. Herein, the degree of hydrolysis may be controlled depending on the equivalent of water used, and the content of silica in the prepared precursor may be controlled by controlling the amount of alcohol in the reactants.

Herein, hydrochloric acid, citric acid, acetic acid, sulfuric acid and the like may be included as the acid catalyst, and any one or a mixture of two or more thereof may be used.

As the base catalyst, ammonia, piperidine and the like may be included, and any one or a mixture of two or more thereof may be used.

As the solvent, solvents having compatibility with water and capable of dissolving alkoxysilane may be used without particular limit, and specific examples thereof may include alcohols such as methanol, ethanol, propanol, isopropanol and butanol, and any one or a mixture of two or more thereof may be used.

Amounts of the materials used in the hydrolysis and condensation reaction of the alkoxysilane-based compound may be properly determined considering the degree of polymerization or the molecular weight of the finally prepared alkoxydisiloxane-based prepolymer. Specifically, the acid catalyst or the base catalyst may be used in 0.0001 moles to 0.001 moles with respect to 1 mole of the alkoxysilane-based compound.

The solvent may be used in 0.6 moles to 4.0 moles with respect to 1 mole of the alkoxysilane-based compound.

The water may be used in 1.2 moles to 1.6 moles with respect to 1 mole of the alkoxysilane-based compound.

In addition, the hydrolysis and condensation reaction of the alkoxysilane-based compound may be carried out at 50° C. to 80° C., and more specifically at 65° C. to 75° C. When carried out in the above-mentioned temperature ranges, the hydrolysis and condensation reaction is sufficiently progressed, and the alkoxydisiloxane-based prepolymer satisfying such a molecular weight condition and the like may be prepared.

As a result of such a reaction, the alkoxydisiloxane-based prepolymer having $(SiO_2)_m$ (herein, m is a positive integer) forming a skeleton, and including a silanol group is prepared.

When using tetraethoxysilane as the alkoxysilane-based compound as one example, polyethoxydisiloxane (PEDS-$P_x$) is prepared as the alkoxydisiloxane-based prepolymer through the hydrolysis and condensation reaction as in the following Reaction Formula 1.

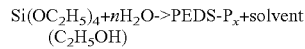   [Reaction Formula 1]

In Reaction Formula 1, n is a molar number of the water used, and n<2.

In addition, due to the preparation condition control, the prepared alkoxydisiloxane-based prepolymer has molecular weight distribution having an m/z (ratio of mass to charge) value of 650 to 3,000 when analyzing the mass by MALDI-TOF, and the molecular weight of the alkoxydisiloxane-derived repeating unit, a major repeating unit, may be from 60 Da to 140 Da, and more specifically from 60 Da to 134 Da.

Next, the step 2 for preparing the aerogel precursor is a step of surface hydrophobization by reacting the alkoxydisiloxane-based prepolymer prepared in the step 1 with the hydrophobic sol-gel forming agent of Chemical Formula 1.

Specifically, the hydrophobic sol-gel forming agent of Chemical Formula 1 is dissolved in a solvent, and then reacted by being mixed with the alkoxydisiloxane-based prepolymer prepared in the step 1.

As the solvent, solvents that do not react with the alkoxydisiloxane-based prepolymer, and is capable of dissolving the hydrophobic sol-gel forming agent may be used without particular limit. Specific examples thereof may include alcohol-based solvents such as ethanol and methanol; aromatic hydrocarbon-based solvents such as toluene and benzene; amide-based solvents such as N,N-dimethylformamide, and the like, and any one or a mixture of two or more thereof may be used.

The hydrophobic sol-gel forming agent of Chemical Formula 1 is the same as described above, and may be used in an amount corresponding to 1 mol % to 60 mol % with respect to the total mole of the alkoxy group in the alkoxydisiloxane-based prepolymer. When the hydrophobic sol-gel forming agent content is less than 1 mol %, a replacement ratio for the alkoxydisiloxane-based prepolymer is low, and therefore, effects according to the present disclosure are insignificant, and when the content is greater than 60 mol %, the degree of hydrophobicity of the prepared aerogel precursor is excessively high causing concern such as inefficient formation of a wet gel.

Through such processes, the hydrophobic sol-gel forming agent of Chemical Formula 1 reacts with a silanol group present at the end of the alkoxydisiloxane-based prepolymer or on the surface of the prepolymer particles, and the aerogel precursor having a functional group derived from the hydrophobic sol-gel forming agent binding on the surface is prepared therefrom.

When compared with an aerogel precursor prepared using existing alkoxysilane or prehydrolyzed alkoxysilane, the aerogel precursor prepared through such processes is capable of forming uniform pores inside an aerogel, and an aerogel having high hydrophobicity may be prepared through surface hydrophobization. Specifically, carbon content inside the aerogel precursor may be 20% by weight or greater and more specifically from 23% by weight to 35% by weight with respect to the total weight of the precursor.

As described above, the functional group derived from the hydrophobic sol-gel forming agent is present at the end of the polymer or on a surface side of the polymer particles while forming uniform pores due to having identical repeating units in the polycondensation step, and therefore, when preparing an aerogel using the same, pores having uniform sizes and exhibiting hydrophobicity may be formed, and as a result, thermal stability of the aerogel may be enhanced.

In addition, the aerogel precursor is obtained in a liquid state in which the surface hydrophobized alkoxydisiloxane-based prepolymer is dispersed into a dispersion medium. Herein, the dispersion medium may be a solvent used in the hydrolysis and polycondensation reaction of the alkoxysilane-based compound, or a solvent used in the reaction with the hydrophobic sol-gel forming agent, and the solvent may be removed through a common drying process.

The aerogel precursor may also be used in a gel state in the aerogel preparation through a wet gel preparation process, or may be used in a liquid state itself in the aerogel preparation.

Accordingly, still another embodiment of the present disclosure provides an aerogel prepared using the aerogel precursor.

Specifically, the aerogel may be prepared by preparing a wet gel through mixing the aerogel precursor prepared above with an alcohol, and then drying the wet gel.

When preparing the wet gel, an inorganic acid or a base may be further used selectively.

The inorganic acid or the base may readily accomplish gelation by controlling a pH in the reaction system.

Specifically, nitric acid, hydrochloric acid, sulfuric acid, acetic acid, hydrofluoric acid or the like may be included as the inorganic acid, and any one or a mixture of two or more thereof may be used. Ammonia, piperidine or the like may be used as the base, and one or more types thereof may be used. When considering effects of facilitating silica surface hydrophobization and gelation according to the use of the inorganic acid or the base, the inorganic acid may be more specifically hydrochloric acid, and the base may be ammonia. In addition, the added amount of the inorganic acid is not particularly limited, however, the inorganic acid may be used in an amount to make the pH in the reaction system 4 to 7, and the base may be used in an amount to make the pH in the reaction system 9 to 12.

The inorganic acid or the base may be introduced at once, or may be introduced in two installments. When introduced in two installments, the inorganic acid or the base introduced in the second installment may induce gelation by facilitating the reaction of the unreacted alkoxy group in the aerogel precursor, and as a result, may increase crosslinking density of the hydrophobic wet gel and further increase hydrophobicity and preparation yields of the silica aerogel.

In addition, after adding the inorganic acid or the base, a mixing process may be carried out for facilitating the reaction. Herein, the mixing process may be carried out using common mixing methods, and is not particularly limited. Specifically, the mixing process may be carried out through stirring, and the stirring may be more specifically carried out for 10 seconds to 10 minutes with 400 rpm to 800 rpm using a magnetic bar, but is not limited thereto.

The drying process for the prepared wet gel carried out thereafter may be carried out by an atmospheric drying process or a supercritical drying process using supercritical carbon dioxide.

Specifically, the atmospheric drying process may be carried out using common methods such as natural drying, hot-air drying or heat drying under atmospheric pressure (1±0.3 atm), and more specifically, may be carried out for 6 hours to 12 hours in a 60° C. to 100° C. oven under atmospheric pressure (1±0.3 atm) after removing a water layer from the washed hydrophobic wel gel.

The supercritical drying process carries out a solvent exchange process in which the wet gel is placed in a supercritical drying reactor, and then the reactor is filled with $CO_2$ in a liquid state, and the alcohol solvent inside the wet gel is replaced by $CO_2$. After that, the temperature was raised to 40° C. to 50° C. at a constant temperature raising rate, specifically at a rate of 0.1/min to 1/min, and then maintained for a certain period of time, specifically for 20 minutes to 1 hour, in a supercritical state of carbon dioxide by maintaining at a pressure greater than a pressure at which carbon dioxide becomes a supercritical state, and specifically a pressure of 100 bar to 150 bar. Generally, carbon dioxide becomes a supercritical state at a temperature of 31° C. and a pressure of 73.8 bar. After maintaining at a certain temperature and a certain pressure at which carbon dioxide becomes a supercritical state for 2 hours to 12 hours and more specifically for 2 hours to 6 hours, the supercritical drying process may be completed by slowly relieving the pressure.

In addition, prior to the drying process or with the drying process, a washing process for obtaining a high purity aerogel may be further carried out by removing impurities (sodium ions, unreacted materials, byproducts and the like) produced during the wet gel preparation process.

Specifically, when the washing process and the drying process are carried out at the same time, a solution extraction method such as a Soxhlet extraction method using a Soxhlet extractor may be used. The Soxhlet extractor is generally a device connecting an extraction tube on a solvent flask, and connecting a reflux condenser thereon, and when placing a sample in a cylindrical filter paper or a filtration tube (thimble) in the extraction tube and heating a solvent in the flask, the solvent evaporates to a vapor phase, and the vapor phase solvent is condensed in the reflux condenser filling the extraction tube to dissolve soluble components in the sample, and by a syphon arm, the filled liquid all comes back to the solvent flask when reaching the vertext, and the extraction tube is filled again with a new solvent. Extraction is repeated with the new solvent as above, and when the extraction is complete, the flask is detached and by evaporating the liquid therein, a final product, a non-volatile component, is left inside the flask. The solution extraction method using the Soxhlet extractor may obtain an impurity-removed dried product through such steps.

In addition, the extraction solvent may have a vapor pressure of 100 kPa or greater and specifically 100 kPa to 10 MPa at 20° C. so as to be readily volatilized in the Soxhlet extraction process and prevent contractions and cracks in the pore structure inside the silica sol.

Furthermore, the extraction solvent may preferably have low surface tension so as to prevent contractions and cracks in the pore structure inside the silica sol during the drying process. Specifically, the extraction solvent may have surface tension of 12 mN/m or less and specifically 0.1 mN/m to 12 mN/m.

More specifically, the extraction solvent may be a nonpolar solvent such as carbon dioxide; or a polar solvent such as dimethyl ether satisfying the above-mentioned conditions. Even more specifically, the extraction solvent may be a nonpolar solvent satisfying the above-mentioned conditions such as carbon dioxide when considering excellence in the solvent exchange.

Meanwhile, the Soxhlet extraction may be carried out at a pressure of 5 bar to 70 bar, and when the extraction solvent is carbon dioxide, the Soxhlet extraction process may be carried out at a pressure of 40 bar to 70 bar and more specifically, may be carried out at a pressure of 40 bar to 60 bar. In addition, when the extraction solvent is dimethyl ether, the Soxhlet extraction may be carried out at a pressure of 5 bar to 20 bar.

When the washing and the drying are carried out at the same time using the solution extraction method such as Soxhlet extraction as described above, a hydrophobic aerogel may be prepared without an additional drying process as well as effectively extracting impurities in the wet gel. Additionally, solvent exchange of the hydrophobic wet gel that is not solvent exchanged may occur simultaneously with the washing.

Meanwhile, when the washing and the drying are separated and carried out in consecutive order, methods of the washing and the drying are not particularly limited, and methods commonly known in the art may be used.

Specifically, the washing process may be carried out by adding a nonpolar organic solvent to a hydrophobic wet gel, and stirring the result for 20 minutes to 1 hour. The nonpolar organic solvent may be the same as described above.

The aerogel prepared according to the preparation method uses the aerogel precursor having hydrophobicity, and therefore, exhibits hydrophobicity inside and outside the pores, and the sizes of the formed pores are uniform, which enhances high temperature thermal stability of the aerogel. In addition, the aerogel may exhibit improved physical properties of low tap density and high specific surface area.

Specifically, the aerogel is a particulate porous structure including a plurality of micropores, and includes a microstructure forming a mesh-type cluster by the bindings of nano-sized first particles, specifically, first particles having an average particle diameter ($D_{50}$) of 100 nm or less, that is, a three-dimensional network structure.

In addition, regarding an effect of hydrophobicity increase, the aerogel may have carbon content of 5% by weight or greater, more specifically 7% by weight or greater and even more specifically 10% by weight to 15% by weight with respect to the total weight of the aerogel. Herein, the carbon content of the aerogel in the present disclosure may be measured using a carbon analyzer.

Regarding an effect of pore property improvement, the aerogel may have an average pore diameter of 10 nm to 15 nm and a total pore volume of 2 $cm^3/g$ to 5 $cm^3/g$.

In addition, the aerogel may have a specific surface area of 500 $m^2/g$ to 800 $m^2/g$ and tap density of 0.05 g/ml to 0.3 g/ml.

In the present disclosure, the tap density of the aerogel may be measured using a tap density measuring instrument (TAP-2S, Logan Instruments Co.), and the specific surface area, the pore size and the pore volume may be analyzed as adsorbed/desorbed amounts of nitrogen depending on a partial pressure ($0.11 < p/p_o < 1$) using an ASAP 2010 instrument of Micrometrics.

The aerogel having such an improved pore structure and increased hydrophobicity may specifically have thermal conductivity of 20 mW/mK or less and more specifically 16 mW/mK or less. In the present disclosure, the thermal conductivity of the aerogel may be measured using a thermal conductivity measuring instrument.

The aerogel having such low tap density, high specific surface area and high hydrophobicity is capable of maintaining low thermal conductivity, and therefore, may be used in various fields such as insulation materials, extremely low dielectric thin films, catalysts, catalyst carriers or blankets, and may be particularly useful in preparing insulation materials, particularly, insulation blankets since low thermal conductivity may be maintained due to such physical/pore properties.

Accordingly, yet another embodiment of the present disclosure provides an insulation material or an insulation blanket prepared using the hydrophobic silica aerogel.

Specifically, the blanket may be prepared using common methods except that the aerogel-containing composition is used. More specifically, the blanket may be prepared by coating the aerogel-containing composition on at least one surface of a substrate for a blanket or immersing the substrate for a blanket into the composition, and drying the result. In addition, after the drying process, a compressing process for controlling the thickness and making the inside structure and the surface form of the blanket uniform, a forming process allowing to have a proper form or morphology depending on the use, or a laminating process laminating a separate functional layer may be further carried out.

Together with the aerogel, the aerogel-containing composition may further include a binder, a solvent, and selectively one or more types of additives such as a dispersing agent, a crosslinking agent or a foaming agent.

As the substrate for a blanket, substrates of various materials may be used depending on the use of the insulation blanket. Specifically, the substrate for a blanket may be a film, a sheet, a net, a fiber, a porous body, a foam, a non-woven fabric or a laminate of two or more layers thereof. In addition, depending on the use, the surface may have surface roughness formed thereon or may be patterned.

The blanket may specifically include a substrate for a blanket and an aerogel disposed on at least one surface of the substrate for a blanket, and may further include an aerogel included in the substrate for a blanket.

Hereinafter, the present disclosure will be described in more detail with reference to the following examples and test examples. However, the following examples and test examples are for illustrative purposes only, and the present disclosure is not limited to these example and test examples.

<Preparation of Alkoxydisiloxane-Based Prepolymer>

Synthesis Example 1

After introducing 150 g of tetraethoxysilane, 51 g of ethanol and 0.04 g of an aqueous 35% hydrochloric acid solution to a 500 mL reactor, the reaction temperature was raised to 70° C. while stirring. When the reaction temperature was maintained at 70° C., 19.4 g of acidified distilled water to which 0.02 g of an aqueous 35% hydrochloric acid solution was introduced was slowly added dropwise thereto over 1 hour, and then the result was reacted for 8 hours. After the reaction was complete, the reactor temperature was lowered to room temperature (23±3° C.). The cooled reactant was vacuum filtered using a filter to remove impurities, and a 75% hydrolyzed prepolymer was prepared.

Figure 1B:
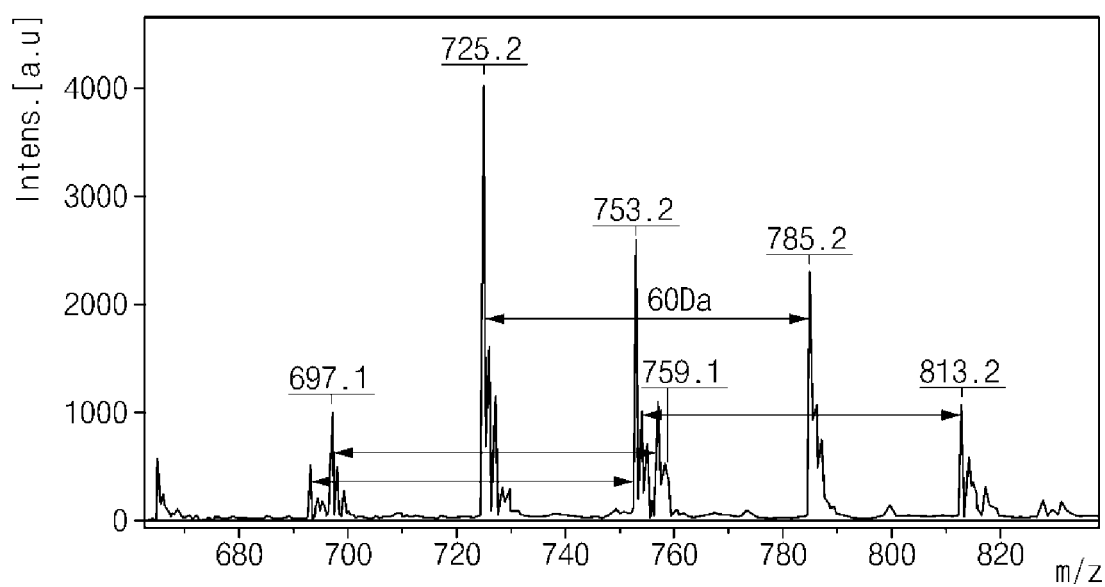

Matrix Associated Laser Desorption Ionization-Time of Flight mass spectrometry (MALDI-TOF) analysis was carried out on the obtained prepolymer, and the results are shown in FIG. 1a and FIG. 1b.

As a result of the analysis, it was identified that the obtained prepolymer had fragmented molecular weight distribution with an m/z of 700 to 2,300, and had an alkoxydisiloxane-derived repeating unit of 60 Da as a major repeating unit.

Synthesis Example 2

After introducing 150 g of tetraethoxysilane, 197 g of ethanol and 0.04 g of an aqueous 35% hydrochloric acid solution to a 500 mL reactor, the reaction temperature was raised to 70° C. while stirring. When the reaction temperature was maintained at 70° C., 12.8 g of acidified distilled water to which 0.02 g of an aqueous 35% hydrochloric acid solution was introduced was slowly added dropwise thereto over 1 hour, and then the result was reacted for 8 hours. After the reaction was complete, the reactor temperature was lowered to room temperature. The cooled reactant was vacuum filtered using a filter to remove impurities, and a 50% hydrolyzed prepolymer was prepared.

Figure 2A:
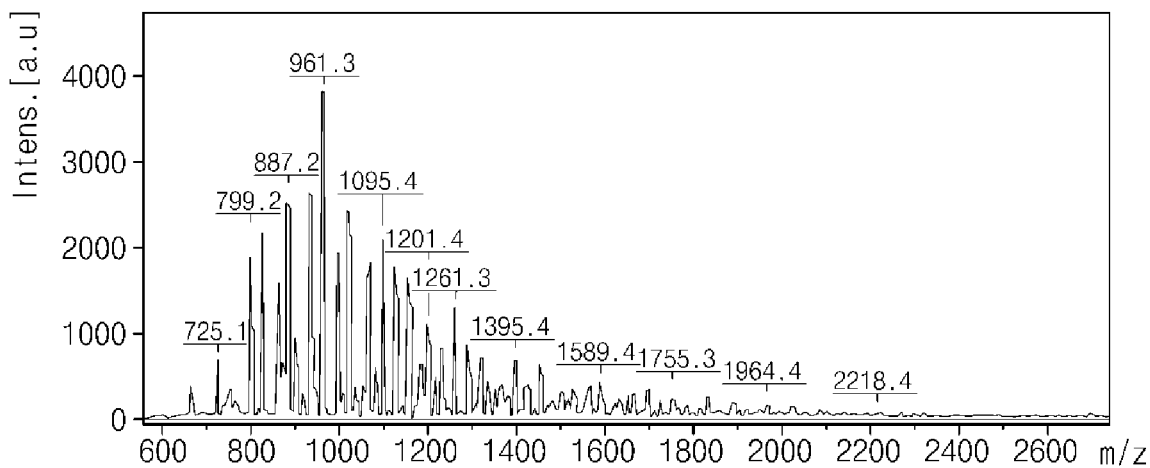
FIG. 2a and FIG. 2b are graphs showing MALDI-TOF mass analysis results for a prepolymer prepared in Synthesis Example 2.
Figure 2B:
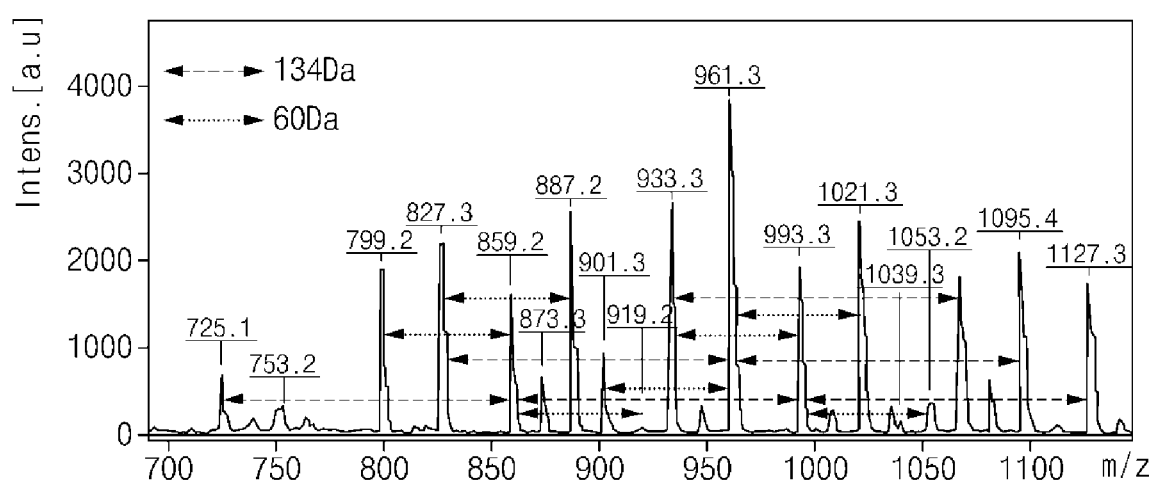

MALDI-TOF mass analysis was carried out on the obtained prepolymer, and the results are shown in FIG. 2a and FIG. 2b. As a result of the MALDI-TOF analysis, it was identified that the obtained prepolymer had fragmented molecular weight distribution with an m/z of 620 to 1,800, and had an alkoxydisiloxane-derived repeating unit of mixed 60 Da and 134 Da as a major repeating unit.

<Preparation of Surface-Hydrophobized Alkoxydisiloxane-Based Prepolymer as Aerogel Precursor>

Preparation Example 1-1

After cooling the prepolymer solution prepared in Synthesis Example 1 to 0° C., 3.9 g (5 mol % of the tetraethoxysilane) of chlorotrimethylsilane diluted in 40 g of ethanol was slowly added dropwise thereto over 1 hour, and then the result was reacted for 4 hours while vigorously stirring. After the reaction was complete, the reactor temperature was lowered to room temperature to prepare a surface-hydrophobized prepolymer. As a result of the MALDI-TOF analysis, the obtained prepolymer maintained fragmented molecular weight distribution with an m/z of 700 to 2,300, and a major repeating unit of 60 Da.

Preparation Example 1-2

After cooling the prepolymer solution prepared in Synthesis Example 1 to 0° C., 7.5 g (5 mol % of the tetraethoxysilane) of chloro(methyl)diphenylsilane diluted in 40 g of ethanol was slowly added dropwise thereto over 1 hour, and then the result was reacted for 4 hours while vigorously stirring. After the reaction was complete, the reactor temperature was lowered to room temperature to prepare a surface-hydrophobized prepolymer. As a result of the MALDI-TOF analysis, the obtained prepolymer maintained fragmented molecular weight distribution with an m/z of 700 to 2,400, and a major repeating unit of 60 Da.

Preparation Example 1-3

After cooling the prepolymer solution prepared in Synthesis Example 1 to 0° C., 11 g (5 mol % of the tetraethoxysilane, CAS No. 61417-49-0) of titanium triisostearoylisopropoxide diluted in 40 g of ethanol was slowly added dropwise thereto over 1 hour, and then the result was reacted for 4 hours while vigorously stirring. After the reaction was complete, the reactor temperature was lowered to room temperature to prepare a surface-hydrophobized prepolymer. As a result of the MALDI-TOF analysis, the obtained prepolymer maintained fragmented molecular weight distribution with an m/z of 700 to 2,300, and a major repeating unit of 60 Da.

Preparation Example 2-1

After cooling the prepolymer solution prepared in Synthesis Example 2 to 0° C., 3.9 g (5 mol % of the tetraethoxysilane) of chlorotrimethylsilane diluted in 40 g of ethanol was slowly added dropwise thereto over 1 hour, and then the result was reacted for 4 hours while vigorously stirring. After the reaction was complete, the reactor temperature was lowered to room temperature to prepare a surface-hydrophobized prepolymer. As a result of the MALDI-TOF analysis, the obtained prepolymer maintained fragmented molecular weight distribution with an m/z of 620 to 1,800.

Preparation Example 2-2

After cooling the prepolymer solution prepared in Synthesis Example 2 to 0° C., 7.5 g (5 mol % of the tetraethoxysilane) of chloro(methyl)diphenylsilane diluted in 40 g of ethanol was slowly added dropwise thereto over 1 hour, and then the result was reacted for 4 hours while vigorously stirring. After the reaction was complete, the reactor temperature was lowered to room temperature to prepare a surface-hydrophobized prepolymer. As a result of the MALDI-TOF analysis, the obtained prepolymer maintained fragmented molecular weight distribution with an m/z of 620 to 1,800

Preparation Example 3-1

After introducing 150 g of tetraethoxysilane, 51 g of ethanol, 3.9 g (5 mol % of the tetraethoxysilane) of chlorotrimethylsilane and 0.04 g of an aqueous 35% hydrochloric acid solution to a 500 mL reactor, the reaction temperature was raised to 70° C. while stirring. When the reaction temperature was maintained at 70° C., 19.4 g of acidified distilled water to which 0.02 g of an aqueous 35% hydrochloric acid solution was introduced was slowly added dropwise thereto over 1 hour, and then the result was reacted for 8 hours. After the reaction was complete, the reactor temperature was lowered to room temperature. The cooled reactant was vacuum filtered using a filter to remove impurities, and a 75% hydrolyzed prepolymer was obtained. As a result of the MALDI-TOF analysis, the obtained prepolymer maintained fragmented molecular weight distribution with an m/z of 620 to 1,800.

Preparation Example 3-2

After introducing 150 g of tetraethoxysilane, 197 g of ethanol, 3.9 g (5 mol % of the tetraethoxysilane) of chlorotrimethylsilane and 0.04 g of an aqueous 35% hydrochloric acid solution to a 500 mL reactor, the reaction temperature was raised to 70° C. while stirring. When the reaction temperature was maintained at 70° C., 12.8 g of acidified distilled water to which 0.02 g of an aqueous 35% hydrochloric acid solution was introduced was slowly added dropwise thereto over 1 hour, and then the result was reacted for 8 hours. After the reaction was complete, the reactor temperature was lowered to room temperature. The cooled reactant was vacuum filtered using a filter to remove impurities, and a 50% hydrolyzed prepolymer was obtained. As a result of the MALDI-TOF analysis, the obtained prepolymer maintained fragmented molecular weight distribution with an m/z of 620 to 1,800.

<Preparation of Aerogel>

Example 1

A mixture of ethanol, distilled water and an ammonia solution was slowly added to the hydrophobized prepolymer of Preparation Example 1-1 to be reacted. Herein, the reaction was carried out at room temperature (23±5° C.) and a mixing weight ratio of the hydrophobized prepolymer:ethanol:distilled water:ammonia solution was 3:8:1:40.1. After stirring the result for approximately 10 minutes, the result was left still to obtain wet gel. Super critical drying was carried out on the obtained wet gel under a condition of 40° C. and 80 atmospheres to prepare an aerogel.

Example 2

An aerogel was prepared in the same manner as in Example 1 except that the hydrophobized prepolymer of Preparation Example 1-2 was used instead of the hydrophobized prepolymer of Preparation Example 1-1.

Example 3

An aerogel was prepared in the same manner as in Example 1 except that the hydrophobized prepolymer of Preparation Example 1-3 was used instead of the hydrophobized prepolymer of Preparation Example 1-1.

Example 4

An aerogel was prepared in the same manner as in Example 1 except that the hydrophobized prepolymer of Preparation Example 2-1 was used instead of the hydrophobized prepolymer of Preparation Example 1-1.

Example 5

An aerogel was prepared in the same manner as in Example 1 except that the hydrophobized prepolymer of Preparation Example 2-2 was used instead of the hydrophobized prepolymer of Preparation Example 1-1.

Comparative Example 1

An aerogel was prepared in the same manner as in Example 1 except that the prepolymer of Preparation Example 3-1 was used.

Comparative Example 2

An aerogel was prepared in the same manner as in Example 1 except that the prepolymer of Preparation Example 3-2 was used.

Test Example: Physical Property Evaluation

In order to comparatively analyze physical properties for the hydrophobic silica aerogels prepared in Examples 1 to 5, and Comparative Examples 1 and 2, tap density, specific surface area and carbon content of each powder were measured, and the results are shown in the following Table 1.

1) Tap Density
Tap density was analyzed using a tap density measuring instrument (TAP-2S, Logan Instruments Co.).

2) Specific Surface Area (BET Surface Area), Average Pore Diameter ($D_p$) and Total Pore Volume ($V_p$)
A specific surface area, an average pore diameter and a pore volume were analyzed as adsorbed/desorbed amounts of nitrogen depending on a partial pressure ($0.11<p/p_o<1$) using an ASAP 2010 instrument of Micrometrics.

3) Carbon Content
Carbon content was analyzed using a carbon analyzer.

TABLE 1

| | Category | | | | |
|---|---|---|---|---|---|
| | Tap Density (g/ml) | Carbon Content (% by Weight) | Specific Surface Area (m²/g) | Average Pore Diameter (nm) | Total Pore Volume (cm³/g) |
| Example 1 | 0.12 | 10.0 | 724 | 13.8 | 3.13 |
| Example 2 | 0.10 | 12.4 | 794 | 14.1 | 3.41 |
| Example 3 | 0.11 | 12.2 | 695 | 12.8 | 2.41 |
| Example 4 | 0.25 | 12.4 | 597 | 12.4 | 2.49 |
| Example 5 | 0.17 | 12.7 | 615 | 12.6 | 2.54 |
| Comparative Example 1 | 0.13 | 12.1 | 690 | 12.8 | 2.85 |
| Comparative Example 2 | 0.30 | 11.8 | 595 | 12.4 | 2.34 |

As a result of the tests, the aerogels of Examples 1 to 6 prepared using an aerogel precursor in which an alkoxydisiloxane-based prepolymer was surface hydrophobized with a hydrophobic sol-gel forming agent exhibited uniform pore properties together with excellent hydrophobicity of 5% by weight or greater of carbon content.

In addition, the aerogels of Examples 1 to 5 prepared using an aerogel precursor in which an alkoxydisiloxane-based prepolymer was surface hydrophobized with a hydrophobic sol-gel forming agent exhibited more improved pore properties while exhibiting an equal level of hydrophobicity when compared to the aerogels of Comparative Examples 1 and 2 using the same hydrophobic sol-gel forming agent as a comonomer when preparing polyethoxydisiloxane, an aerogel precursor.

What is claimed is:

1. An aerogel precursor comprising an alkoxydisiloxane-based prepolymer, and having a functional group derived from a hydrophobic sol-gel forming agent of the following Chemical Formula 2 on a surface thereof:

[Chemical Formula 1]

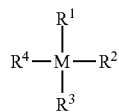

wherein:
M$^{11}$ is any one selected from the group consisting of group 4 elements and group 14 elements;
R$^{11}$ is a halogen group;
R$^{12}$ and R$^{13}$ each independently is selected from the group consisting of an alkyl group having 1 to 20 carbon atoms, an alkenyl group having 2 to 20 carbon atoms, an alkynyl group having 2 to 20 carbon atoms, a cycloalkyl group having 3 to 20 carbon atoms, an aryl group having 6 to 20 carbon atoms, an arylalkyl group having 7 to 20 carbon atoms and an alkylaryl group having 7 to 20 carbon atoms; and
R$^{14}$ is selected from the group consisting of an alkyl group having 2 to 20 carbon atoms, an alkenyl group having 2 to 20 carbon atoms, an alkynyl group having 2 to 20 carbon atoms, a cycloalkyl group having 3 to 20 carbon atoms, an aryl group having 6 to 20 carbon atoms, an arylalkyl group having 7 to 20 carbon atoms and an alkylaryl group having 7 to 20 carbon atoms,
wherein the alkoxydisiloxane-based prepolymer has a degree of hydrolysis of 50% to 85%, and
the alkoxydisiloxane-based prepolymer includes an alkoxydisiloxane-derived repeating unit having a molecular weight of 60 Da to 140 Da and a molecular weight distribution with an m/z (ratio of mass to charge) value of 620 to 1,800 when analyzing the mass by MALDI-TOF.

2. The aerogel precursor of claim 1, wherein M is selected from the group consisting of Ti, Hf, Si and Zr.

3. The aerogel precursor of claim 1, wherein:
M$^{11}$ is Si;
R$^{11}$ is a chloro group, a bromo group or an iodo group; and
R$^{12}$ and R$^{13}$ each independently is selected from the group consisting of an alkyl group having 1 to 12 carbon atoms, an aryl group having 6 to 12 carbon atoms, an arylalkyl group having 7 to 13 carbon atoms and an alkylaryl group having 7 to 13 carbon atoms; and
R$^{14}$ is selected from the group consisting of an alkyl group having 2 to 12 carbon atoms, an aryl group having 6 to 12 carbon atoms, an arylalkyl group having 7 to 13 carbon atoms and an alkylaryl group having 7 to 13 carbon atoms.

4. The aerogel precursor of claim 3, wherein, in Chemical Formula 2:
R$^{11}$ is a chloro group or a bromo group;
R$^{12}$ and R$^{13}$ each independently is selected from the group consisting of an alkyl group having 1 to 12 carbon atoms, an aryl group having 6 to 12 carbon atoms, an arylalkyl group having 7 to 13 carbon atoms and an alkylaryl group having 7 to 13 carbon atoms; and R$^{14}$ is selected from the group consisting of an alkyl group having 2 to 12 carbon atoms, an aryl group having 6 to 12 carbon atoms, an arylalkyl group having 7 to 13 carbon atoms and an alkylaryl group having 7 to 13 carbon atoms.

5. The aerogel precursor of claim 1, wherein the hydrophobic sol-gel forming agent includes any one or a mixture of two or more selected from the group consisting of chlorotriethylsilane, bromotriethylsilane and chloro(methyl)diphenylsilane.

6. The aerogel precursor of claim 1, wherein the functional group derived from the hydrophobic sol-gel forming agent is included in 0.1 mol % to 60 mol % with respect to a total mole of the alkoxy group in the alkoxydisiloxane-based prepolymer.

7. The aerogel precursor of claim 1, which has a carbon content of 20% by weight or greater with respect to a total weight of the aerogel precursor.

8. A method for preparing the aerogel precursor of claim 1, the method comprising:
preparing the alkoxydisiloxane-based prepolymer having a molecular weight distribution with an m/z (ratio of mass to charge) value of 620 to 3,000 when analyzing the mass by MALDI-TOF by hydrolyzing and polycondensation reacting an alkoxysilane-based compound; and
reacting the alkoxydisiloxane-based prepolymer with the hydrophobic sol-gel forming agent of Chemical Formula 2:

<Chemical Formula 2>

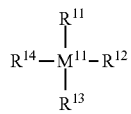

wherein:
M$^{11}$ is any one selected from the group consisting of group 4 elements and group 14 elements;
R$^{11}$ is a halogen group;
R$^{12}$ and R$^{13}$ each independently is selected from the group consisting of an alkyl group having 1 to 20 carbon atoms, an alkenyl group having 2 to 20 carbon atoms, an alkynyl group having 2 to 20 carbon atoms, a cycloalkyl group having 3 to 20 carbon atoms, an aryl group having 6 to 20 carbon atoms, an arylalkyl group having 7 to 20 carbon atoms and an alkylaryl group having 7 to 20 carbon atoms; and
R$^{14}$ is selected from the group consisting of an alkyl group having 2 to 20 carbon atoms, an alkenyl group having 2 to 20 carbon atoms, an alkynyl group having 2 to 20 carbon atoms, a cycloalkyl group having 3 to 20 carbon atoms, an aryl group having 6 to 20 carbon atoms, an arylalkyl group having 7 to 20 carbon atoms and an alkylaryl group having 7 to 20 carbon atoms.

9. The method for preparing the aerogel precursor of claim 8, wherein the alkoxysilane-based compound includes tetraethoxysilane.

10. The aerogel precursor of claim 1, wherein M$^{11}$ is Si.

11. An aerogel precursor comprising an alkoxydisiloxane-based prepolymer, and having a functional group derived from a hydrophobic sol-gel forming agent of the following Chemical Formula 3 on a surface thereof, wherein the hydrophobic sol-gel forming agent includes a compound of the following Chemical Formula 3:

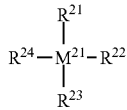

[Chemical Formula 3]

wherein, in Chemical Formula 3,
$M^{21}$ is Ti or Zr; and
$R^{21}$ to $R^{24}$ are each independently a hydrophobic functional group selected from the group consisting of an alkyl group having 1 to 10 carbon atoms, a cycloalkyl group having 3 to 12 carbon atoms, an aryl group having 6 to 12 carbon atoms, an arylalkyl group having 7 to 13 carbon atoms, an alkylaryl group having 7 to 13 carbon atoms; or a functional group reactive with the alkoxydisiloxane-based prepolymer that is a halogen group or an alkoxy group having 1 to 10 carbon atoms, however, $R^{21}$ to $R^{24}$ are not a hydrophobic functional group or a functional group reactive with the alkoxydisiloxane-based prepolymer at the same time,
wherein the alkoxydisiloxane-based prepolymer has a degree of hydrolysis of 50% to 85%, and
the alkoxydisiloxane-based prepolymer includes an alkoxydisiloxane-derived repeating unit having a molecular weight of 60 Da to 140 Da and a molecular weight distribution with an m/z (ratio of mass to charge) value of 620 to 1,800 when analyzing the mass by MALDI-TOF.

12. The aerogel precursor of claim 11, wherein, in Chemical Formula 3, $M^{12}$ is Ti.

13. An aerogel precursor comprising an alkoxydisiloxane-based prepolymer, and having a functional group derived from a hydrophobic sol-gel forming agent of the following Chemical Formula 2 on a surface thereof:

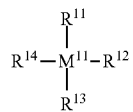

[Chemical Formula 2]

wherein:
$M^{11}$ is any one selected from the group consisting of group 4 elements and group 14 elements;
$R^{11}$ is a halogen group;
$R^{12}$ and $R^{13}$ each independently is selected from the group consisting of an alkyl group having 1 to 20 carbon atoms, an alkenyl group having 2 to 20 carbon atoms, an alkynyl group having 2 to 20 carbon atoms, a cycloalkyl group having 3 to 20 carbon atoms, an aryl group having 6 to 20 carbon atoms, an arylalkyl group having 7 to 20 carbon atoms and an alkylaryl group having 7 to 20 carbon atoms; and
$R^{14}$ is selected from the group consisting of an alkyl group having 2 to 20 carbon atoms, an alkenyl group having 2 to 20 carbon atoms, an alkynyl group having 2 to 20 carbon atoms, a cycloalkyl group having 3 to 20 carbon atoms, an aryl group having 6 to 20 carbon atoms, an arylalkyl group having 7 to 20 carbon atoms and an alkylaryl group having 7 to 20 carbon atoms,
wherein the alkoxydisiloxane-based prepolymer has a degree of hydrolysis of 50% to 85%, and
the alkoxydisiloxane-based prepolymer includes an alkoxydisiloxane-derived repeating unit having a molecular weight of 60 Da to 140 Da and
the alkoxydisiloxane-based prepolymer has a molecular weight distribution with an m/z (ratio of mass to charge) value of 650 to 3,000 when analyzing the mass by MALDI-TOF.

14. The aerogel precursor of claim 13, wherein $M^{11}$ is Si.

* * * * *

UNITED STATES PATENT AND TRADEMARK OFFICE
CERTIFICATE OF CORRECTION

PATENT NO. : 11,078,084 B2
APPLICATION NO. : 15/736725
DATED : August 3, 2021
INVENTOR(S) : Hee Jung Choi et al.

Page 1 of 2

It is certified that error appears in the above-identified patent and that said Letters Patent is hereby corrected as shown below:

In the Claims

At Column 17, Lines 2-43, please replace Claim 1 with the following:
1. An aerogel precursor comprising an alkoxydisiloxane-based prepolymer, and having a functional group derived from a hydrophobic sol-gel forming agent of the following Chemical Formula 2 on a surface thereof:

<Chemical Formula 2>

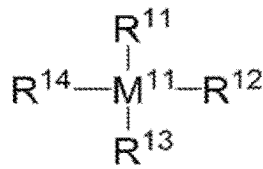

wherein:
$M^{11}$ is any one selected from the group consisting of group 4 elements and group 14 elements;
$R^{11}$ is a halogen group;
$R^{12}$ and $R^{13}$ each independently is selected from the group consisting of an alkyl group having 1 to 20 carbon atoms, an alkenyl group having 2 to 20 carbon atoms, an alkynyl group having 2 to 20 carbon atoms, a cycloalkyl group having 3 to 20 carbon atoms, an aryl group having 6 to 20 carbon atoms, an arylalkyl group having 7 to 20 carbon atoms and an alkylaryl group having 7 to 20 carbon atoms; and
$R^{14}$ is selected from the group consisting of an alkyl group having 2 to 20 carbon atoms, an alkenyl group having 2 to 20 carbon atoms, an alkynyl group having 2 to 20 carbon atoms, a cycloalkyl group having 3 to 20 carbon atoms, an aryl group having 6 to 20 carbon atoms, an arylalkyl group having 7 to 20 carbon atoms and an alkylaryl group having 7 to 20 carbon atoms,
wherein the alkoxydisiloxane-based prepolymer has a degree of hydrolysis of 50% to 85%, and Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office* the alkoxydisiloxane-based prepolymer includes an alkoxydisiloxane-derived repeating unit having a molecular weight of 60 Da to 140 Da and a molecular weight distribution with an m/z (ratio of mass to charge) value of 620 to 1,800 when analyzing the mass by MALDI-TOF.

At Column 19, Lines 34-35, please replace Claim 12 with the following:
12. The aerogel precursor of Claim 11, wherein, in Chemical Formula 3, $M^{21}$ is Ti.